United States Patent [19]
Ito et al.

[11] Patent Number: 5,808,428
[45] Date of Patent: Sep. 15, 1998

[54] CONTROL SYSTEM FOR ELECTRIC VEHICLE

[75] Inventors: Hisahiro Ito; Koji Tamenori; Atsushi Shibutani; Morio Kayano; Tomoyuki Itoh, all of Wako, Japan

[73] Assignee: Honda Giken Kogyo Kabushiki Kaisha, Tokyo, Japan

[21] Appl. No.: 674,841

[22] Filed: Jul. 3, 1996

[30] Foreign Application Priority Data

Jul. 3, 1995 [JP] Japan .................................... 7-167405

[51] Int. Cl.$^6$ ................. B60L 3/00; B60L 15/00
[52] U.S. Cl. ............................ 318/139; 340/636; 320/43
[58] Field of Search ........................... 318/139; 320/43, 320/48, 61; 324/425, 426, 427, 433; 340/636; 180/65.1; 364/424.026, 483

[56] References Cited

U.S. PATENT DOCUMENTS 3,568,175  3/1971  Schwehr et al. .
4,394,741  7/1983  Lowndes .
5,119,011  6/1992  Lambert .
5,367,455  11/1994  Kitagawa et al. .

*Primary Examiner*—Bentsu Ro
*Attorney, Agent, or Firm*—Nikaido, Marmelstein, Murray & Oram LLP

[57] ABSTRACT

When the voltage of a battery is dropped down to a first threshold value (9.5 V) or less, the driving force of a motor is decreased to a level Y(0)–Y(7) of a limit power determined in accordance with a remaining capacity of the battery. When the voltage is not restored even after a predetermined time is lapsed from the decreasing of the driving force to the level Y(0)–Y(7), the driving force is further decreased down to a lower level Y(0)–Y(7). When the voltage of the battery is restored to a second threshold value (10 V), the driving force of the motor is gradually increased up to a level Z(0)–Z(7) of a limit power determined in accordance with the capacity of the battery. Thus, it is possible to prevent a deep discharging of the battery, while minimizing the influence on the traveling of the vehicle.

4 Claims, 8 Drawing Sheets

CONTROL SYSTEM FOR ELECTRIC VEHICLE

BACKGROUND OF THE INVENTION

1. Field of the Invention

The present invention relates to a control system for an electric vehicle including a battery and a motor connected to driven wheels. The control system includes a motor control means for driving the motor by a predetermined driving force dependent upon the operational state of the vehicle, and a driving-force control means connected to the motor control means for limiting the driving force of the motor in accordance with the condition or state of the battery.

2. Description of the Related Art

An electric vehicle using a motor driven by a battery as a traveling power source has a problem that if the vehicle keeps traveling in a condition wherein a remaining capacity of the battery is reduced, the battery can fall into a deep discharged state. In this deep discharged state, the battery can be damaged, resulting in a significantly shortened life thereof.

Therefore, it is a conventional practice that when the voltage of the battery is equal to or less than a predetermined threshold value, the driving of the motor of the vehicle is stopped, and when the voltage of the battery is restored by the stoppage of the motor, the driving of the motor is restarted.

However, the conventional electric vehicle suffers from a problem that the driving and the stoppage of the motor are controlled simply based on the voltage of the battery, and therefore even if the battery has a sufficient remaining capacity, the vehicle may be prevented from traveling when the voltage drops. Another problem is that when the remaining capacity of the battery is decreased, the voltage can drop due to only a temporary increase in accelerator opening degree. When the voltage is thereafter restored after a brief period of time, the motor is driven again and the driving and stopping of the motor is repeated at short intervals, resulting in an annoying and uncomfortable driving situation. A further problem is that when the motor is driven for a long period of time with a lower torque, it is difficult for the voltage of the battery to be dropped down to the threshold value or less, even if the battery has a decreased remaining capacity. Therefore, the driving of the motor can be continued, leading to the undesirable and damaging deep discharging of the battery.

A control system has been proposed in U.S. Pat. No. 5,367,455, in which even if the remaining capacity (discharge depth) of the battery is equal to or smaller than a predetermined value, the driving of the motor is continued only by limitation of the speed or acceleration of the vehicle, and therefore there is also a possibility that the battery is deeply discharged.

SUMMARY OF THE INVENTION

Accordingly, it is an object of the present invention to provide a control system for an electric vehicle, wherein the deep discharging of the battery can be reliably prevented, while minimizing the negative influences on the traveling of the electric vehicle.

To achieve the above object, according to the present invention, there is provided a control system for an electric vehicle including a battery and a motor connected to driven wheels, the control system comprising a motor control means for driving the motor by a predetermined driving force dependent upon the operational state of the vehicle, and a driving-force control means connected to the motor control means for limiting the driving force of the motor in accordance with the state of the battery. When the voltage of the battery detected by a voltage detecting means is dropped down to a level which is lower than a first threshold value, the driving force control means decreases the driving force of the motor. When the voltage of the battery is not restored even after a predetermined time from the decreasing of the driving force of the motor, the driving force control means further decreases the driving force of the motor.

With this type of arrangement, when the voltage of the battery detected by the voltage detecting means is dropped down to the level lower than the first threshold value, the driving force of the motor is decreased. When the voltage of the battery is not restored even after the predetermined time from the decreasing of the driving force of the motor, the driving force of the motor is further decreased. Therefore, the vehicle can continue to travel, while avoiding damage to the battery due to the deep discharging phenomenon.

In addition, according to the present invention, there is provided a control system for an electric vehicle including a battery and a motor connected to driven wheels, the control system comprising a motor control means for driving the motor by a predetermined driving force dependent upon the operational state of the vehicle, and a driving-force control means connected to the motor control means for limiting the driving force of the motor in accordance with the state of the battery. When the voltage of the battery detected by a voltage detecting means is dropped down to a level lower than a first threshold value, the driving force control means decreases the driving force of the motor in accordance with the remaining capacity of the battery detected by a remaining capacity detecting means.

With this type of arrangement, when the voltage of the battery detected by the voltage detecting means is dropped down to the level lower than the first threshold value, the driving force of the motor is decreased in accordance with the remaining capacity of the battery detected by the remaining capacity detecting means. Therefore, the driving force of the motor can be immediately decreased to a value dependent upon a capacity of the battery, thereby avoiding damage to the battery due to deep discharging.

The above and other objects, features and advantages of the invention will become apparent from the following detailed description of preferred embodiments, taken in conjunction with the accompanying drawings.

DETAILED DESCRIPTION OF THE PREFERRED EMBODIMENTS

Figure 1:
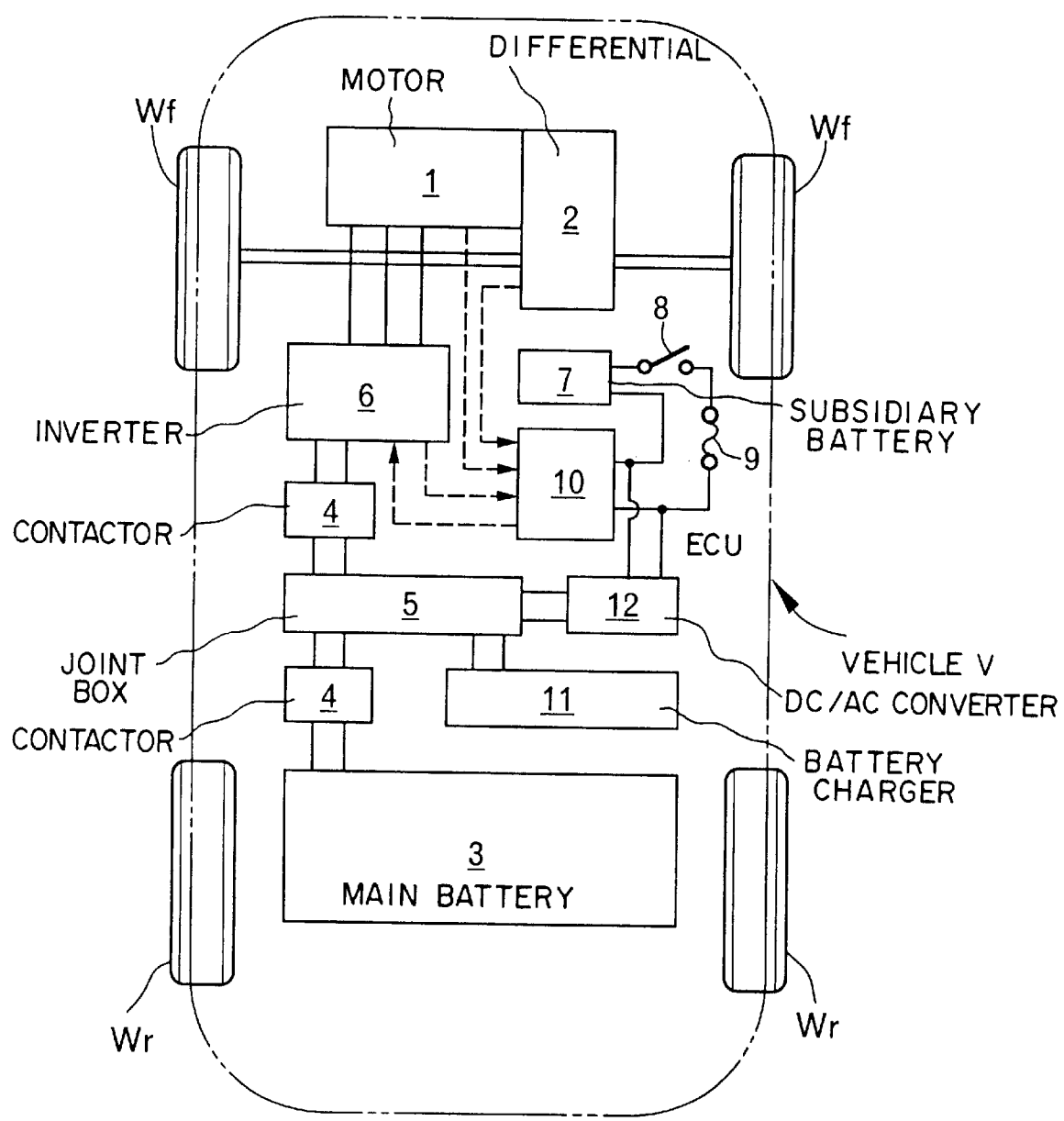
FIG. 1 is a diagrammatic illustration of an electric vehicle including a control system according to a first embodiment of the present invention.
Figure 2:
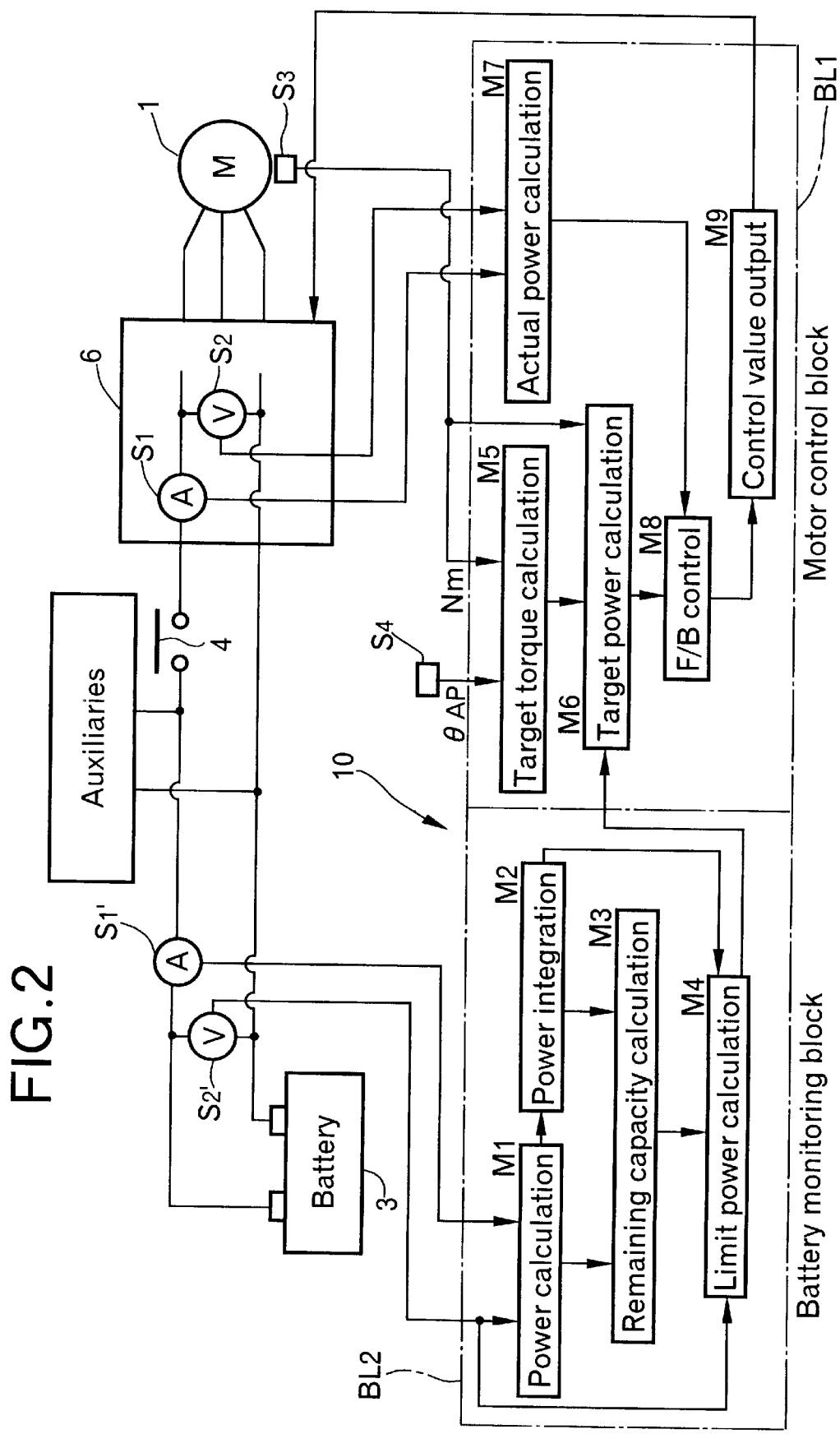
FIG. 2 is a block diagram of a control section.

Referring to FIGS. 1 and 2, a four-wheel electric vehicle V has a pair of left and right front wheels Wf, Wf as driven wheels to which a torque of a three-phase AC motor 1 is transmitted through a differential 2, and a pair of left and right rear wheels Wr, Wr as follower wheels. A main battery 3 is mounted at a rear portion of the electric vehicle V and connected to the motor 1 through a contactor 4, a joint box 5, another contactor 4 and an inverter 6 constituting a power drive unit. An electronic control unit 10 is connected to a subsidiary battery 7 of, for example, 12 volts through a main switch 8 and a fuse 9 and is also connected to the inverter 6 to control the driving torque and the regenerative torque of the motor 1. A battery charger 11 and a DC/DC converter 12 are mounted to charge the subsidiary battery 7 by electric power of the main battery 3. The main battery 3 is formed of 24 smaller batteries of, for example, 12 V, connected in series to one another. The terminal voltage of the main battery is, therefore, 288 V.

The contactor 4 is operated by a key switch (not shown) provided at a driver's seat. When non-traveling positions (such as a stopping position and an accessory position) are selected, the contactor 4 is opened to prevent the vehicle from traveling, and when a traveling position is selected, the contactor 4 is closed to enable the vehicle to travel.

A DC section of the inverter is provided with an electric current sensor $S_1$ for detecting an electric current $I_{PDU}$ in the DC section, and a voltage sensor $S_2$ for detecting a voltage $V_{PDU}$ in the DC section. The electric current $I_{PDU}$ in the DC section of the inverter 6 detected by the electric current sensor $S_1$ and the voltage $V_{PDU}$ in the DC section of the inverter 6 detected by the voltage sensor $S_2$ are input to the electronic control unit 10. Mounted in the vicinity of the main battery 3 are an electric current sensor $S_1'$ for detecting an electric current $I_B$ output from the main battery 3, and a voltage sensor $S_2'$ for detecting a battery voltage $V_B$ which is the terminal voltage of the battery 3. The electric current $I_B$ and the voltage $V_B$ are input to the electronic control unit 10. Further, a motor revolution-number Nm detected by a motor revolution-number sensor $S_3$ and an accelerator opening degree $\theta_{AP}$ detected by an accelerator opening degree sensor $S_4$ are input to the electronic control unit 10.

Referring to FIG. 2, the electric current sensor $S_1'$ and the voltage sensor $S_2'$ mounted on the input side of the contactor 4 are used to calculate a remaining capacity of the main battery. The electric current sensor $S_1'$ detects an electric current from the main battery 3, including an electric current in auxiliaries such as an air conditioner and the like, and the voltage sensor $S_2'$ constantly monitors the voltage of the main battery 3, including times when the vehicle is stopped. The current sensor $S_1$ and the voltage sensor $S_2$ mounted on the output side of the contactor 4 are used to calculate an electric power input to the inverter 6 during traveling of the vehicle to estimate an output from the motor 1.

The inverter 6 includes a plurality of switching elements. By inputting a switching signal to each of the switching elements during driving of the motor 1, the DC power of the main battery 3 is converted into three-phase AC power and supplied to the motor 1, and during non-driving of the motor 1 (regenerative operation), three-phase AC power generated by the motor 1 is converted into a DC power and supplied to the main battery 3.

In a range of lower number of revolutions of the motor 1, the inverter 6 is subjected to PWM (pulse width modulation) control, and in a range of higher number of revolutions of the motor 1 after the duty factor of the PWM control has reached 100%, the inverter 6 is subjected to what is referred to as field weakening control. The field weakening control is to reduce the entire field to increase the number of revolutions of the motor 1 into a larger value, wherein a primary electric current to be supplied to the motor 1 is provided with field electric current components, such that a field is generated in an opposite direction from a field generated by a permanent magnet of the motor 1.

Figure 3:
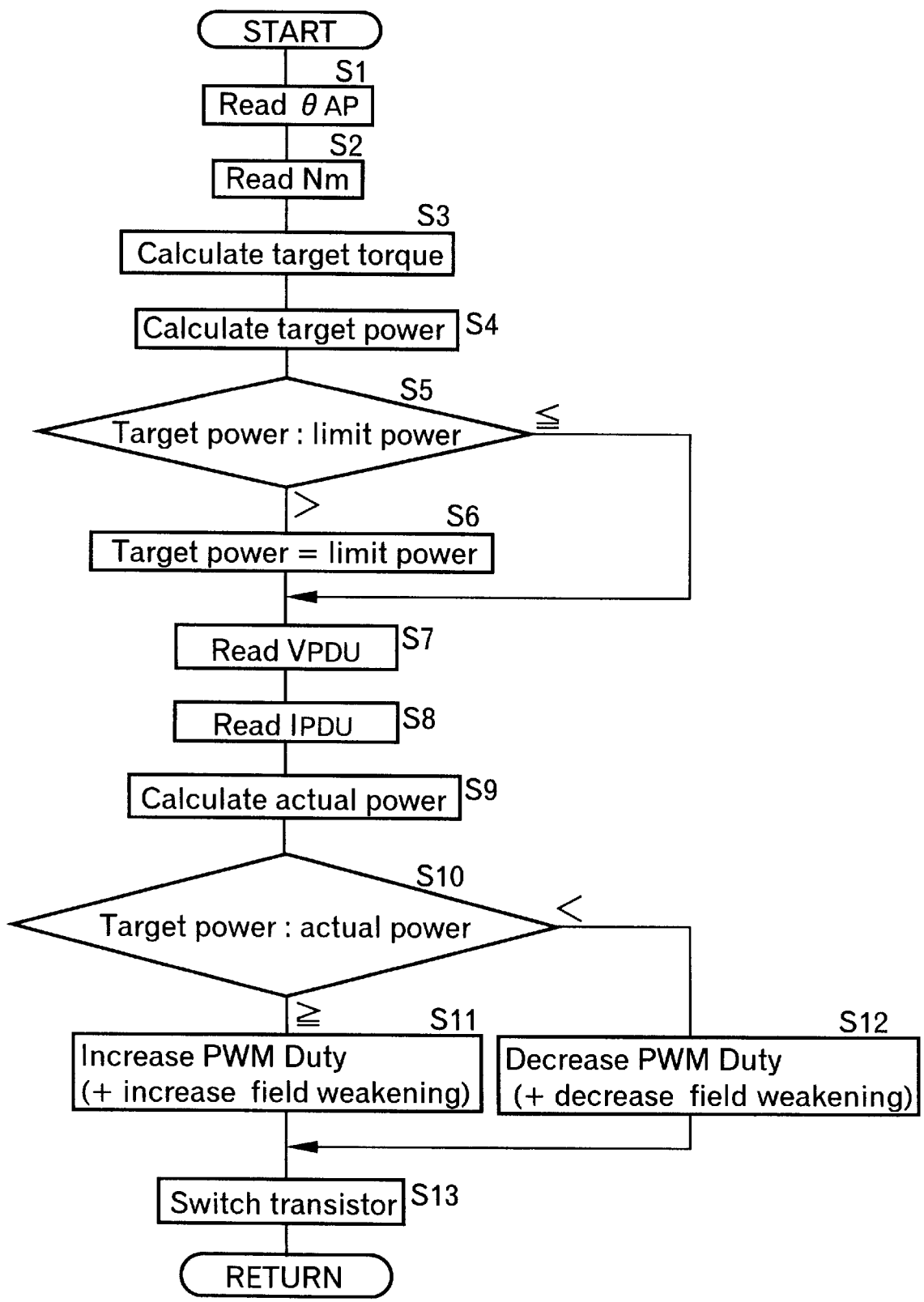
FIG. 3 is a flowchart illustrating a main routine.

The circuit arrangement and the operation of the electronic control unit 10 will be described below, with reference to the block diagram in FIG. 2 and the flowchart in FIG. 3.

The electronic control unit 10 of the present invention includes a battery monitoring block BL2 as a driving-force control means and a motor control block BL1 as a motor control means. The battery monitoring block BL2 includes a power calculating means M1, a power integrating means M2, a remaining-capacity calculating means M3 and a limit power calculating means M4. The motor control block BL1 includes a target torque calculating means M5, a target power calculating means M6, an actual power calculating means M7, a feedback control means M8, and a control value calculating means M9.

The power calculating means M1 of the battery monitoring block BL2 calculates an electric power taken out of the main battery 3 by multiplying the electric current $I_B$ detected by the current sensor $S_1'$ by the voltage $V_B$ detected by the voltage sensor $S_2'$. The power integrating means M2 integrates this voltage by a time to calculate an integration power consumed from the main battery 3. The remaining-capacity calculating means M3 calculates a remaining capacity R by subtracting the integration power from an initial capacity of the main battery 3. The limit power calculating means M4 calculates a limit power (at levels Y(0)–Y(7), Z(0)–Z(7)) based on the remaining capacity R, the integration power and the voltage $V_B$. The calculation of the limit power will be described hereinafter.

The initial capacity of the main battery 3 can be estimated from a voltage $V_B$ provided at the time when the electric current $I_B$ taken out of the main battery 3 is zero. The initial capacity of the main battery 3 is reset to a predetermined value determined by a rated capacity of the main battery 3 whenever the main battery 3 is charged. The resetting of the initial capacity to the predetermined value determined by the rated capacity is based on the assumption that the main battery 3 has been fully charged, but various corrections may be carried out in consideration of a case where the charging of the main battery 3 has been discontinued prior to completion, and the case where the main battery has been deteriorated, resulting in the initial capacity being reduced.

The target torque calculating means M5 of the motor control block BL1 calculates a target torque, by a table searching, which is intended to be generated in the motor 1 by a driver, based the motor revolution-number Nm detected by motor revolution-number sensor $S_3$ and the accelerator opening degree $\theta_{AP}$ detected by the accelerator opening degree sensor $S_4$ (at steps S1, S2 and S3). Torque command values include a driving torque command value and a regenerative torque command value. The driving torque command value corresponds to the case where a driving torque is generated in the motor 1, and the regenerative torque command value corresponds to the case where a regenerative torque is generated in the motor 1. In calculating the target torque, a shift position (gear ratio) is taken into consideration, in addition to the motor revolution-number Nm and the accelerator opening degree $\theta_{AP}$.

The target power calculating means M6 calculates a target power to be supplied to the motor 1 or to be taken out of the motor 1 by regenerative operation, by multiplying the torque command value calculated in the target torque calculating means M5 and the motor revolution-number Nm detected by the motor revolution-number sensor $S_3$ by each other and dividing the resulting value by a converting efficiency (at step S4). At this time, the limit power calculated by the limit power calculating means M4 and the target power are compared with each other, and if the target power exceeds the limit power, then the upper limit of the target power is limited by the limit power (at steps S5 and S6). The target power may be a positive value in one case and a negative case in the other case. The positive target power corresponds to the case where the motor 1 generates the driving torque, and the negative target power corresponds to the case where the motor 1 generates the regenerative torque.

The actual power calculating means M7 calculates an actual power input to the inverter 6 by multiplying the electric current $I_{PDU}$ in the DC section of the inverter 6 detected by the current sensor $S_1$ and the voltage $V_{PDU}$ in the DC section of the inverter 6 detected by the voltage sensor $S_2$ by each other (at steps S7, S8 and S9). As is the target power, the actual power may be also a positive value in one case and a negative case in the other case. The positive actual power corresponds to the case where the motor 1 generates the driving torque, and the negative actual power corresponds to the case where the motor 1 generates the regenerative torque.

The target power calculated in the target power calculating means M6 and the actual power calculated in the actual power calculating means M7 are input to the feedback control means M8 and compared with each other. If the actual power is equal to or smaller than the target power, then the control value outputting means M9 controls the elements of the inverter 6 in a switching manner, such that the actual power is equalized to the target power by increasing the duty rate (or by increasing the field weakening quantity). If the actual power exceeds the target power, then the control value outputting means M9 controls the elements of the inverter 6 in a switching manner, such that the actual power is equalized to the target power by decreasing the duty rate (or by decreasing the field weakening quantity) (at steps S10, S11, S12 and S13).

Figure 4:
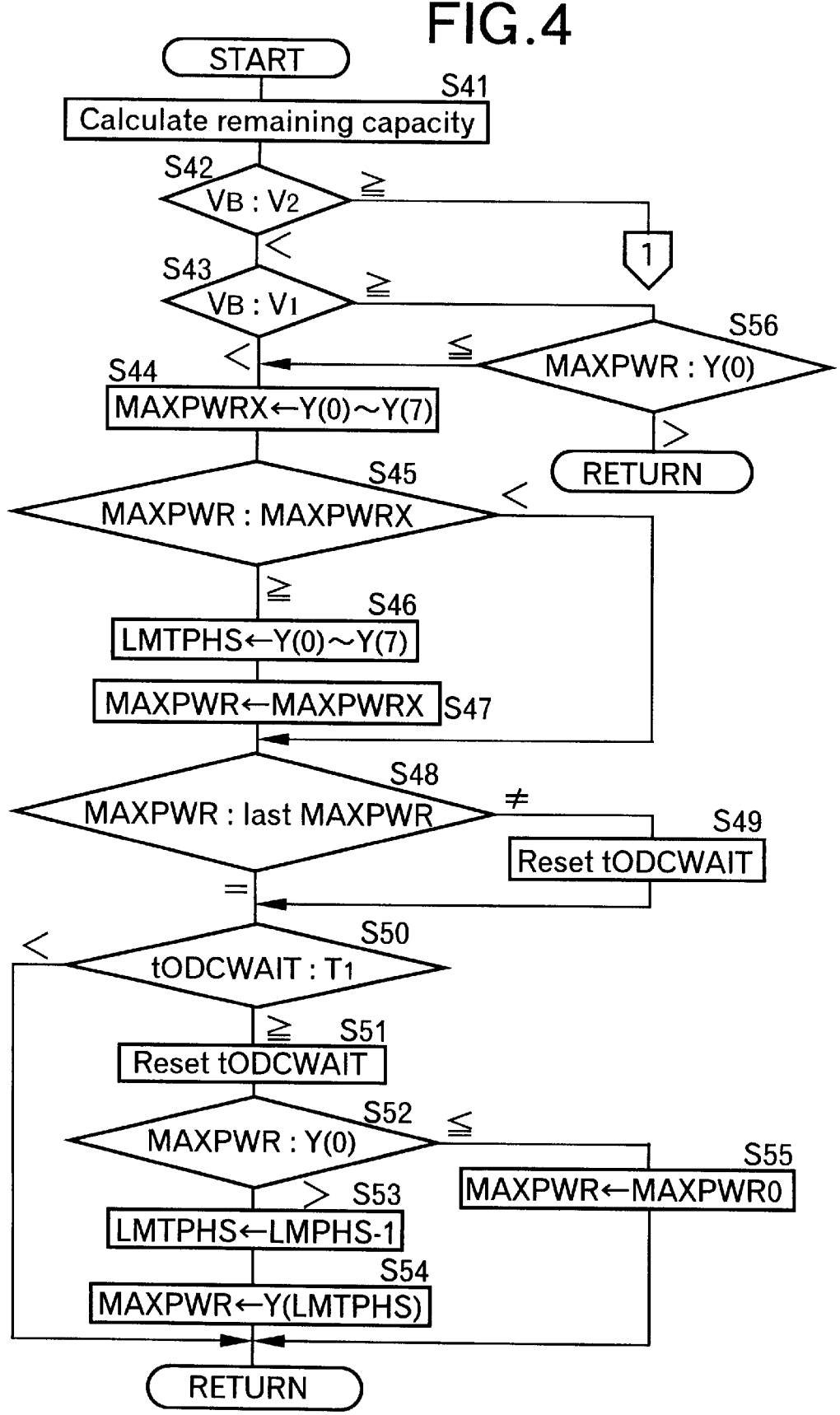
FIG. 4 is a first portion of a flowchart illustrating a limit power calculating routine.
Figure 5:
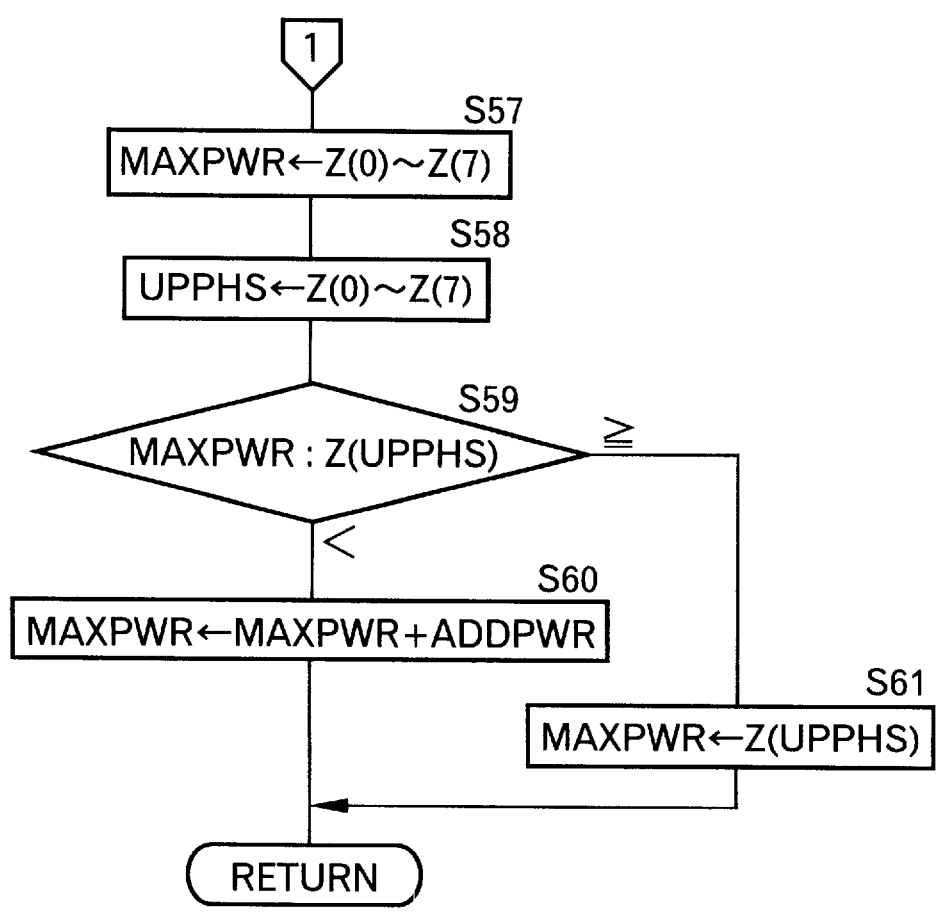
FIG. 5 is a second portion of the flowchart illustrating the limit power calculating routine.

A limit power calculating method carried out in the limit power calculating means M4 shown in FIG. 2 will be described below with reference to the flowcharts in FIGS. 4 and 5.

First, at step S41, a remaining capacity R of the main battery 3 is calculated by the above-described method. Then, if the voltage $V_B$ of the main battery 3 (the voltage $V_B$ of the main battery 3 itself) detected by the voltage sensor $S_2$' is smaller than a second threshold value $V_2$ (=10 V) at step S42, and the voltage $V_B$ is smaller than a first threshold value $V_1$ (=9.5 V) at step S43, the processing is advanced to step S44 at which levels Y(0)–Y(7) of the limit power corresponding to the remaining capacity R of the main battery 3 is table-searched. The power value at one of the searched levels Y(0)–Y(7) which corresponds to the current remaining capacity R is defined as a limit power initial value MAXPWRX.

Figure 6:
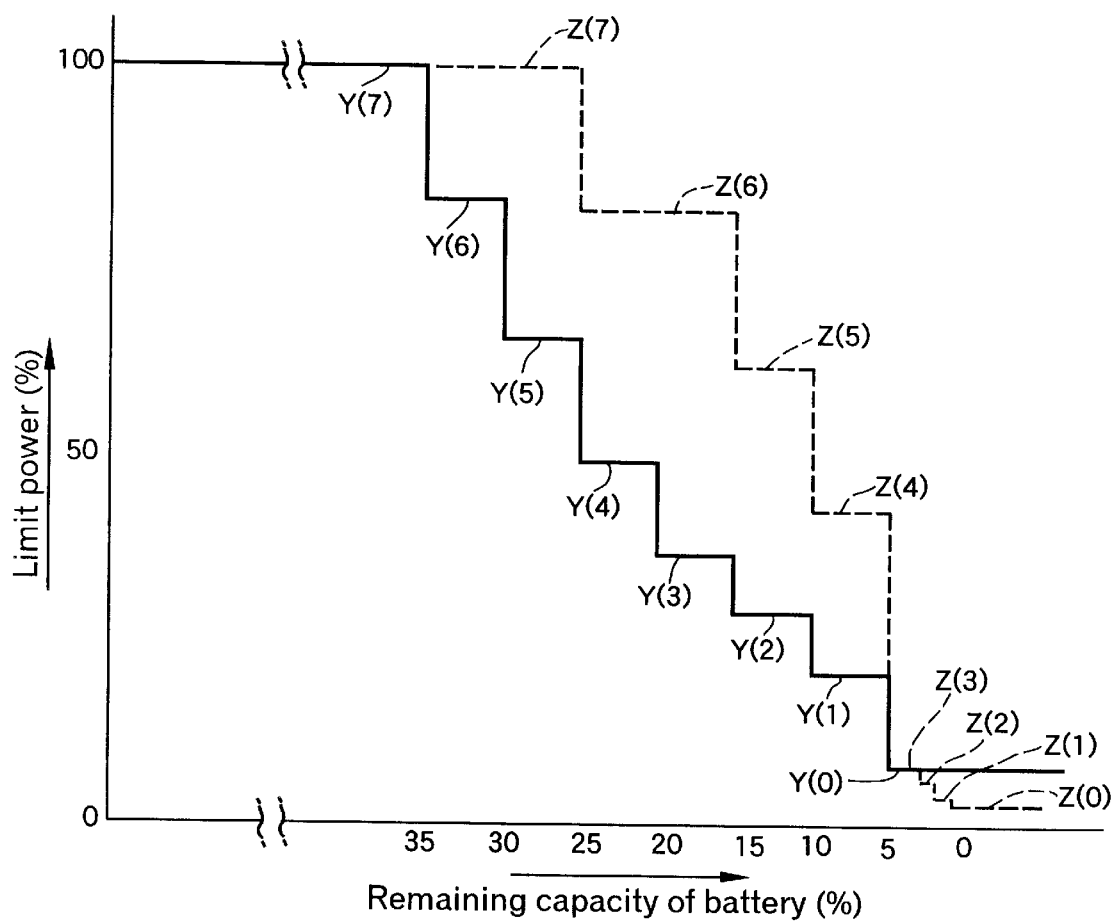
FIG. 6 is a diagram illustrating a table of limiting the output from the battery and a table of restoring the output.

FIG. 6 shows a table for searching the levels Y(0)–Y(7) of the limit power. The level of the limit power MAXPWR is divided into levels Y(0)–Y(7) of 8 stages in accordance with the remaining capacity R of the main battery 3. For example, if the remaining capacity R is equal to or larger than 35%, the level Y(7) at which 100% of the maximum power of the main battery 3 is defined as the limit power, is selected. If the remaining capacity R is equal to or larger than 5%, the level Y(0) at which 8% of the maximum power of the main battery 3 is defined as the limit power, is selected. Further, levels Y(6)–Y(1) are stepwise established between the levels Y(7) and Y(0).

Each of the levels Y(0)–Y(7) of the limit power is a maximum power value capable of being output at the current remaining capacity R of the main battery 3 (a power value which is such that even if it is output, the main battery 3 is not adversely affected), and is experimentally determined. However, in the case where if the output of this minimum power value is maintained, the voltage $V_B$ remains lowered due to an estimation error of the remaining capacity R of the main battery 3 or the like, such output is further lowered in a manner which will be described hereinafter.

Then, at step S45, the current limit power MAXPWR and the limit power initial value MAXPWRX are compared with each other. If the limit power initial value MAXPWRX is equal to or smaller than the limit power MAXPWR, selected levels Y(0)–Y(7) are stored in a memory LMTPHS at step S47, and the limit power initial value MAXPWRX is defined as the limit power MAXPWR at step S47. If the limit power initial value MAXPWRX is larger than the limit power MAXPWR at step S45, the steps S46 and S47 are skipped. Thus, when the voltage $V_B$ of the main battery 3 is smaller than the first threshold value $V_1$(=9.5 V), the level Y(0)–Y(7) is prevented from becoming higher than the last level (i.e., the level of the limit power MAXPWR is prevented from being raised).

At step S48, the current and last values of limit power MAXPWR are compared with each other. If the current and last values are different from each other (i.e., if the level of the current limit power MAXPWR is lowered), a timer tODCWAIT is set at step S49. If the counted time of the timer tODCWAIT exceeds a predetermined time $T_1$(=1 sec) at step S50, the timer tODCWAIT is reset at step S51.

Then, if the limit power MAXPWR is not at the minimum level Y(0) at step S52, the level Y(1)–Y(7) stored in the memory LMTPHS is lowered by one stage at step S53, and the level Y(1)–Y(7) lowered by one stage is defined as the limit power MAXPWR.

After the voltage $V_B$ of the main battery 3 has become smaller than 9.5 V which is the first threshold value $V_1$ and the level of the limit power MAXPWR has been lowered by one stage, if the voltage $V_B$ is not restored even if 1 second has lapsed, the level of the limit power MAXPWR is further lowered by one stage, thereby providing protection of the main battery 3.

On the other hand, if the limit power MAXPWR has already reached the minimum level Y(0) at step S52, the further lowering of the level is impossible, and therefore, the limit power MAXPWR is set at a limit power value MAXPWRO permitting the vehicle to creep-travel. This limit power value MAXPWRO is set even smaller than the minimum level Y(0).

If the voltage $V_B$ of the main battery 3 is smaller than 9.5 V which is the first threshold value $V_1$, as described above, the limit power MAXPWR corresponding to the then remaining capacity R of the main battery 3 is immediately selected and hence, damage to the main battery due to deep discharging can be reliably and effectively prevented. Moreover, the driving force of the motor 1 is stepwise lowered in accordance with the levels Y(0)–Y(7) and hence, the sudden lowering in driving force of the motor 1 is avoided, leading to an improved impression of travel. Further, the level of the limit power MAXPWR is lowered dispersedly rather than continuously, and therefore, the driver can be allowed to perceive the lowering of the level every time to appreciate the reduction in capacity of the main battery 3.

If the voltage $V_B$ is smaller than the second threshold value $V_2$ at step S42 and equal to or larger than the first threshold value $V_1$ at step S43, i.e., if the 9.5 V≦$V_B$<10 V, it is determined at step S56 whether the limit power MAXPWR has already reached the minimum level Y(0). If the limit power MAXPWR has not reached the minimum level Y(0), the processing is returned to step S41, at which the current limit power MAXPWR is maintained as it is. On the other hand, if the limit power MAXPWR has reached the minimum level Y(0), the processing is passed to step S44, as is when the voltage $V_B$ is smaller than the first threshold value $V_1$.

If the voltage $V_B$ has been restored up to the second threshold value $V_2$ or more at step S42, i.e., if $V_B$≧10 V, the processing is advanced to step S57, at which the level Z(0)–Z(7) of the limit power MAXPWR is searched in Table, and the searched level Z(0)–Z(7) is defined as a limit power MAXPWR which is a restoration target value. As shown in FIG. 6, the level Z(0)–Z(7) of the limit power MAXPWR which is the restoration target value is divided into levels Z(0)–Z(7) of 8 stages in a range of 0% to 25% of the remaining capacity R of the main battery 3.

The level Z(0)–Z(7) of the limit power is a maximum power value (which is a power value such that if an output larger than this power value is restored, it is not preferable for the main battery 3) capable of being output at the current remaining capacity R of the main battery, and is experimentally determined.

Then, at step S58, the searched level Z(0)–Z(7) is stored in a memory UPPHS. If the stored level Z (UPPHS) exceeds the current limit power MAXPWR at step S59, a predetermined value ADDPWR is added to the current limit power MAXPWR at step S60. As a result, the limit power MAXPWR is increased by a predetermined value increment in every loop, such that the current limit power MAXPWR approaches the level Z(UPPHS).

If the limit power MAXPWR reaches the level Z (UPPHS) at step S59, the level Z (UPPHS) is defined as the limit power MAXPWR at step S61.

If the voltage $V_B$ of the main battery 3 is equal to or larger than 10 V which is the second threshold value $V_2$, as described above, the power is gradually increased toward the limit power MAXPWR corresponding to the now remaining capacity R of the main battery. Therefore, the driving force of the motor 1 can be restored, while preventing the damage to the main battery due to a sudden increase in load.

A second embodiment of the present invention will now be described with reference to FIGS. 7 and 8. The second embodiment is different from the first embodiment mainly with respect to the arrangement of the motor control block BL1.

In the first embodiment, because the power generated by the motor 1 can be presumed or estimated by the power input to the inverter 6, the feedback control is conducted such that the power input to the inverter becomes equal to the target power. In the second embodiment, because the torque generated by the motor 1 is proportional to the phase current in each energized phase of the motor 1, the feedback control is conducted such that the energized current of the motor 1 becomes equal to a target current. In this case, the battery monitoring block BL2 defines an accessible value of power from the main battery 3 as a power value. Therefore, a limit torque corresponding to this power value is determined, and the processing is carried out such that the target torque determined based on the operational condition of the vehicle does not exceed the limit torque.

Figure 7:
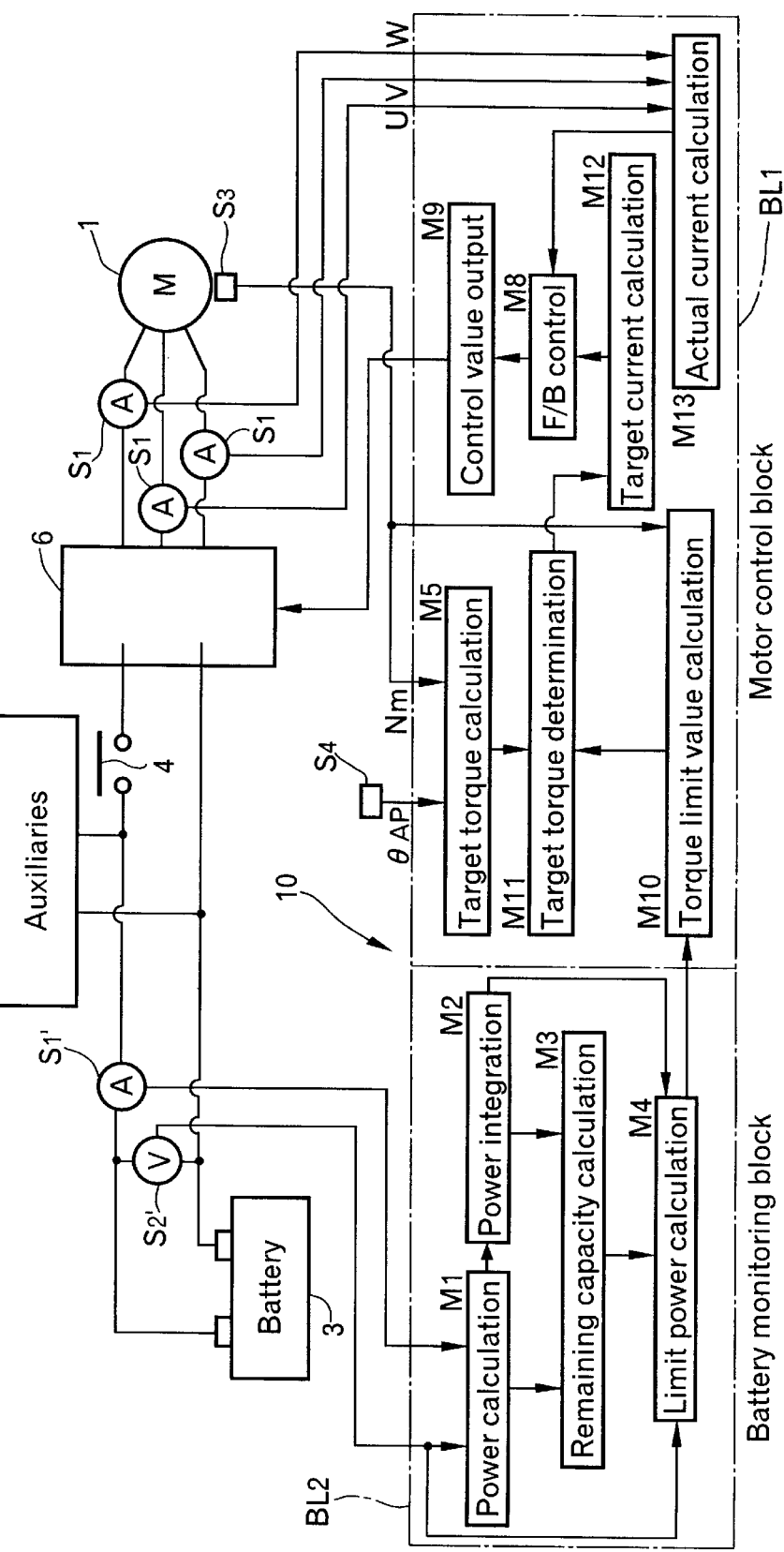
FIG. 7 is a block diagram of a control section according to a second embodiment of the present invention.
Figure 8:
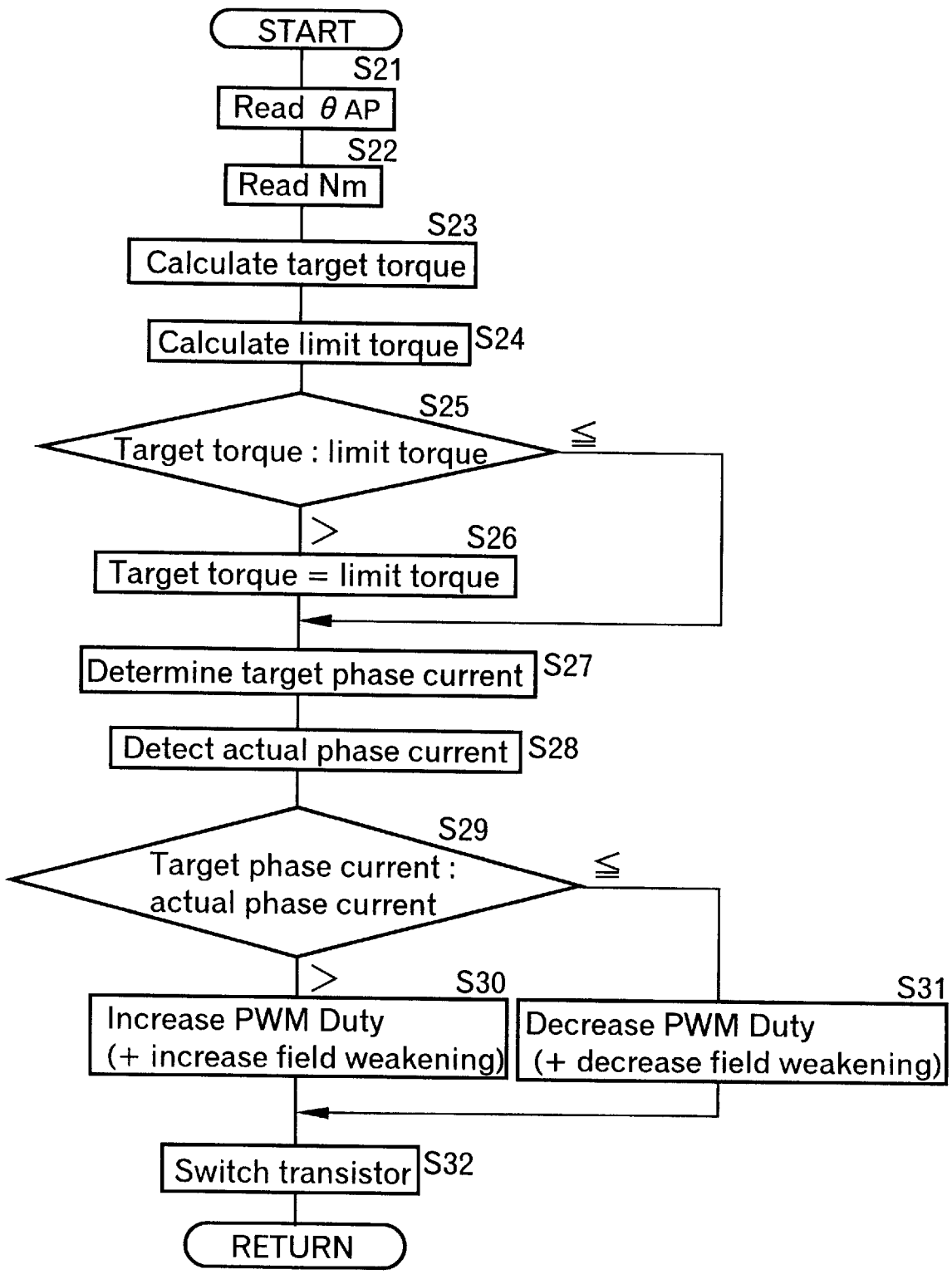
FIG. 8 is a flowchart explaining the operation of the present invention.

As shown in FIG. 7, the motor control block BL1 in the second embodiment includes a target torque calculating means M5, a torque limit value calculating means M10, a target torque determining means M11, a target power calculating means M12, an actual current calculating means M13, a feedback control means M8 and a control value outputting means M9. Current sensors $S_1$ for detecting three AC U-phase, V-phase and W-phase currents are mounted on the output side of the inverter 6, and signals from these current sensors $S_1$ are input to the actual current calculating means M13.

The operation of the second embodiment will be described below with reference to FIGS. 7 and 8.

The function of the battery monitoring block BL2 is the same as in the first embodiment. The limit power calculating means M4 calculates a limit power (at levels Y(0)–Y(7), Z(0)–Z(7)) of the main battery 3 based on the remaining capacity R, the integration power, and the voltage $V_B$.

The target torque calculating means M5 of the motor control block ML1 calculates, by table-searching, a target torque which is intended to be generated in the motor by the driver, based on the motor revolution-number Nm detected by the motor revolution-number sensor $S_3$ and the accelerator opening degree $\theta_{AP}$ detected by the accelerator opening degree sensor S4 (at steps S21, S22 and S23). The torque limit value calculating means M10 calculates a limit torque T by converting the limit power MAXPWR calculated in the limit power calculating means M4 into a torque of the motor 1 according to the following equation (at step S24).

$$T = (MAXPWR * \eta) / (Nm * k)$$

wherein $\eta$ is a motor total efficiency; Nm is a motor revolution-number; and k is a torque-power converting factor.

The target torque determining means M11 compares the target torque calculated in the target torque calculating means M5 with the limit torque calculated in the torque limit value calculating means M10, and if the target torque exceeds the limit torque, the target torque determining means M11 determines a final target torque by limiting the upper limit of the target torque by the limit torque (at steps S25 and S26).

Then, the target current calculating means M12 calculates a target phase current by dividing the final target torque by a torque constant. The actual current calculating means M13 detects an actual phase current in three AC U-phase, V-phase and W-phase, based on outputs from the current sensors $S_1$ (at step S28). The target phase current and the target actual phase current are input to the feedback control means M8 and compared with each other. If the actual phase current is equal to or smaller than the target phase current, the control value outputting means M9 controls the elements in a switching manner to equalize the actual phase current to the target phase current by increasing the duty rate (or by increasing a field weakening quantity). On the other hand, if the actual phase current exceeds the target phase current, the control value outputting means M9 controls the elements in a switching manner to equalize the actual phase current to the target phase current by decreasing the duty rate (or by decreasing a field weakening quantity, at steps S29, S30, S31 and S32).

Although the embodiments of the present invention have been described in detail, it will be understood that the present invention is not limited to the above-described embodiments, and various modifications in design may be made without departing from the spirit and scope of the invention defined in the attached claims.

For example, particular values of the first threshold value $V_1$, the second threshold value $V_2$ and the predetermined time $T_1$ are not limited to those in the described embodiments. If the values of the first and second threshold values $V_1$ and $V_2$ are variable in accordance with the remaining capacity R of the battery 3, such that they are increased as the remaining capacity R is decreased, the lowering of the level from a higher voltage $V_B$ is effected, thereby further reliably preventing a deep discharging of the main battery 3.

What is claimed is:

1. A control system for an electric vehicle including a battery and a motor connected to driven wheels, said control system comprising:

motor control means for driving the motor by a driving force which is determined based upon an operational state of the vehicle;

voltage detecting means for detecting a voltage of the battery;

remaining capacity detecting means for detecting a remaining capacity of the battery:

timer means; and driving-force control means connected to said motor control means, said voltage detecting means, said remaining capacity detecting means and said timer means for limiting the driving force of the motor in accordance with a condition of said battery, wherein said driving-force control means includes first means which is operated such that when the voltage of said battery detected by the voltage detecting means is dropped down lower than a first threshold value, said first means decreases the driving force of said motor from a first level to a second level that is based upon the remaining capacity of said battery detected by the remaining capacity detecting means, second means which is operated such that when the voltage of said battery is not restored after a predetermined time is lapsed set by said timer means from the decreasing of the driving force of the motor caused by said first means, said second means further decreases the driving force of the motor, third means which is operated such that when the voltage of said battery is restored to a second threshold value which is higher than the first threshold value, said third means restores the driving force of the motor to a third level and fourth means which is operated such that when the voltage of said battery is between said first and second threshold values, said fourth means maintains the driving force of the motor at the second level, wherein an amount of decrease and an amount of restoration in the driving force of the motor are provided based on the remaining capacity of said battery and a resultant decreased or restored driving force of the motor is a maximum driving force the motor can output without causing damage to said battery.

2. A control system for an electric vehicle according to claim 1, wherein said driving force control means further includes a map for determining said amount of decrease in the driving force of the motor which is dependent upon the remaining capacity of the battery.

3. A control system for an electric vehicle according to claim 2, wherein said map for determining said amount of decrease in the driving force of the motor is formed to have step-wise values so that a driver can recognize a decrease in the capacity of the battery.

4. A control system for an electric vehicle according to claim 1, wherein said driving force control means further includes a map for determining said amount of restoration in the driving force of the motor which is dependent upon the remaining capacity of the battery.

* * * * *

UNITED STATES PATENT AND TRADEMARK OFFICE
CERTIFICATE OF CORRECTION

PATENT NO. : 5,808,428

DATED : September 15, 1998

INVENTOR(S) : Ito et al.

It is certified that error appears in the above-identified patent and that said Letters Patent is hereby corrected as shown below:

Column 10, lines 2 and 3, insert -- set by said timer means -- after "predetermined time" and before "is lapsed"

Column 10, line 3, after "is lapsed" delete "set by said timer means"

Signed and Sealed this

Fifteenth Day of December, 1998

Attest:

Attesting Officer

BRUCE LEHMAN

Commissioner of Patents and Trademarks